United States Patent
Coowar

(10) Patent No.: US 6,511,647 B1
(45) Date of Patent: Jan. 28, 2003

(54) METHOD OF MAKING A MANGANESE OXIDE-BASED MATERIALS

(75) Inventor: Fazlil Coowar, Didcot (GB)

(73) Assignee: Accentus plc, Didcot (GB)

( * ) Notice: Subject to any disclaimer, the term of this patent is extended or adjusted under 35 U.S.C. 154(b) by 0 days.

(21) Appl. No.: 09/786,329

(22) PCT Filed: Aug. 31, 1999

(86) PCT No.: PCT/GB99/02858

§ 371 (c)(1),
(2), (4) Date: Mar. 2, 2001

(87) PCT Pub. No.: WO00/15557

PCT Pub. Date: Mar. 23, 2000

(30) Foreign Application Priority Data

Sep. 11, 1998 (GB) .............................................. 9819696

(51) Int. Cl.$^7$ .............................................. C01G 45/00
(52) U.S. Cl. ...................... 423/599; 423/594; 423/593
(58) Field of Search .................. 423/599, 593, 423/594, 596; 429/224, 218.1, 219, 220, 221, 223

(56) References Cited

U.S. PATENT DOCUMENTS 5,264,201 A * 11/1993 Dahn et al. ................. 423/599
5,961,950 A * 10/1999 Dahn et al. ................. 423/599

FOREIGN PATENT DOCUMENTS

| EP | 624552 | * 11/1994 |
| WO | 97/26683 | * 7/1997 |

* cited by examiner

Primary Examiner—Steven Bos
(74) Attorney, Agent, or Firm—William H. Holt

(57) ABSTRACT

An oxide $LiMnO_2$ which has a layered monoclinic structure, and in which a minor part of the manganese may be replaced by another transition metal, is made by a two-stage process. Firstly $NaXo_2$ with a layered structure of the $\alpha$-$NaFeO_2$-type is made by reacting stoichiometric amounts of a sodium salt and a salt of the metal X in solution so as to form a precipitate, drying and heat treating the precipitate at a temperature between 650 and 720° C. in air, and then rapidly cooling the precipitate to room temperature in air. Then the $NaXO_2$ is subjected to ion exchange with a lithium salt in solution in a non-alcoholic solvent at a temperature between about 140 and 210° C. The resulting lithium manganese oxide can be used as the cathode material in a rechargeable lithium cell.

6 Claims, 3 Drawing Sheets

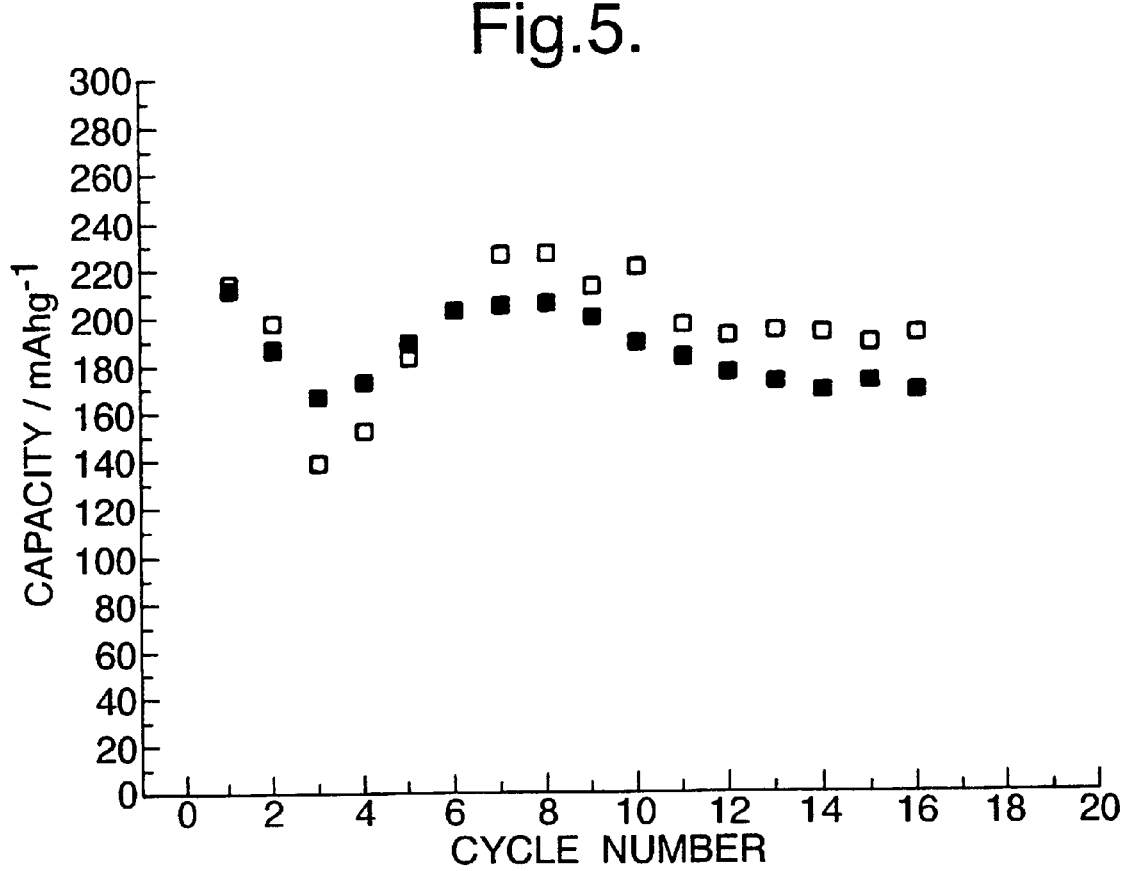

METHOD OF MAKING A MANGANESE OXIDE-BASED MATERIALS

This invention relates to a method of making a manganese oxide-based material.

A variety of different manganese oxide-based materials have been suggested for use in lithium cells or lithium ion cells as an insertion material for use in the cathode. There appear to be four different oxides with stoichiometry $LiMn_2$: lithiated spinel $Li_2Mn_2O_4$ with tetragonal symmetry; orthorhombic $LiMnO_2$ which may be synthesized at high temperature (for example by reaction of lithium oxide with $Mn_2O_3$ under argon), but which does not have good electrochemical activity; orthorhombic $LiMnO_2$ produced at low temperatures, which appears to have reversible electrochemical activity; and a layered $LiMnO_2$ which is said to have reversible electrochemical activity.

For example orthorhombic $LiMnO_2$ is described in an article by Koetschau et al. (J. Electrochem. Soc., Vol. 142, No. 9 (1995), p. 2906) and is reported to convert to spinel $Li_xMn_2O_4$ during the first removal of lithium; this orthorhombic oxide was used in a cell as cathode material, with carbon (in the form of mesocarbon microbeads) as the anode material, and was found to cycle. The orthorhombic oxide and its conversion to the spinel form is also described in an article by Gummow et al. (Mat. Res. Bull., Vol. 28 (1993), p. 1249). Doeff et al. describe the formation of an orthorhombic sodium-based oxide, $Na_{0.44}Mn_2$, in which the sodium ions can undergo ion exchange with lithium ions, forming a lithiated oxide which is stable and can undergo electrochemical cycling (see J. Electrochem. Soc., Vol. 143 (1996), No. 8, p. 2507). $LiMnO_2$ in a layered monoclinic structure is described in WO 97/26683 (Bruce et al.), this material being produced by forming a corresponding sodium based oxide, followed by ion exchange by contacting with a lithium salt dissolved in an alcohol (n-pentanol, n-hexanol or n-octanol); some electrochemical cycling of this layered oxide was possible.

According to the present invention, there is provided a method of making an oxide $LiQ_xMn_{(1-x)}O_2$, in which Q represents a transition metal and x is less than 0.5, with a layered monoclinic structure, the method comprising:

(a) synthesizing $NaQ_xMn_{(1-x)}O_2$ with a layered structure similar to that of $\alpha$-$NaFeO_2$ by reacting stoichiometric amounts of a sodium salt, a manganese (II) salt, and a salt of the metal Q in solution so as to form a precipitate, drying the precipitate in air, heating the dry precipitate to a temperature of between 650 and 720° C. in air, and then cooling the precipitate to room temperature in air; and (b) subjecting the $NaQ_xMn_{(1-x)}O_2$ to ion exchange with a lithium salt in solution in a non-alcoholic organic solvent at a temperature between about 140 and 210° C.

Manganese might be the only transition metal, i.e. x=0. Alternatively the oxide may contain two (or more) transition metals, by replacing some of the manganese with for example cobalt or nickel. The rapid cooling of the sodium-based oxide may be brought about by performing the heating process with the precipitate in a dish of a good heat conductor (such as silver), and by then removing the dish containing the precipitate from the furnace and placing it in contact with a large metal block at room temperature. This rapid cooling has been found to produce a product with a significantly improved crystal structure.

The ion exchange process is desirably performed under reflux, using a solvent which boils in the specified temperature range. For example the solution might be of lithium bromide in dimethyl acetamide (DMA), or in N-methyl pyrrolidone (NMP). There is desirably a considerable excess, for example a five-fold excess, of the lithium salt with respect to the sodium-based oxide to ensure that the ion exchange process goes substantially to completion, so that all the sodium is replaced by lithium.

The invention will now be further and more particularly described, by way of example only, and with reference to the accompanying drawings in which:

FIG. 5 shows graphically the variation in cell capacity for a cell of the invention during the first 16 cycles.

A method of making the sodium manganese oxide $NaMnO_2$ of the layered $\alpha$-$NaFeO_2$ structure by solid state reactions is known, for example from the Bruce et al. patent application, and from Fuchs et al. (Solid State Ionics 68 (1994) p. 279). In this process stoichiometric quantities of sodium carbonate and manganese oxide $Mn_2O_3$ are intimately mixed and ground, and then heated in a furnace at 700–730° C. under flowing argon for several hours (e.g. 48 hours); the oxide is then furnace cooled and then removed from the furnace.

The present invention uses a solution method to make this oxide (i.e. a chimie douce method), as such a method produces smaller particles than those obtained by the conventional solid state method, which is desirable in the context of electrochemical cells. A first method used sodium carbonate and manganese (II) acetylacetonate. Stoichiometric amounts of these salts were dissolved in an azeotrope mixture of methanol/water, and in methanol, respectively. The sodium carbonate solution was then added to the manganese salt solution while stirring, and a brown precipitate was obtained. The solvents were removed using a rotary evaporator, and the brown solid was ground and then heated in an oven at 250° C. in air for 12 hours. The resulting solid was ground again, placed in a silver dish, heated to 670° C. in air in a furnace for 8 hours, and then rapidly cooled by removing the dish from the furnace and placing it on a large block of steel at room temperature. One sample of the salt was made by this procedure, except that it was allowed to cool gradually after the furnace treatment.

Figure 1:
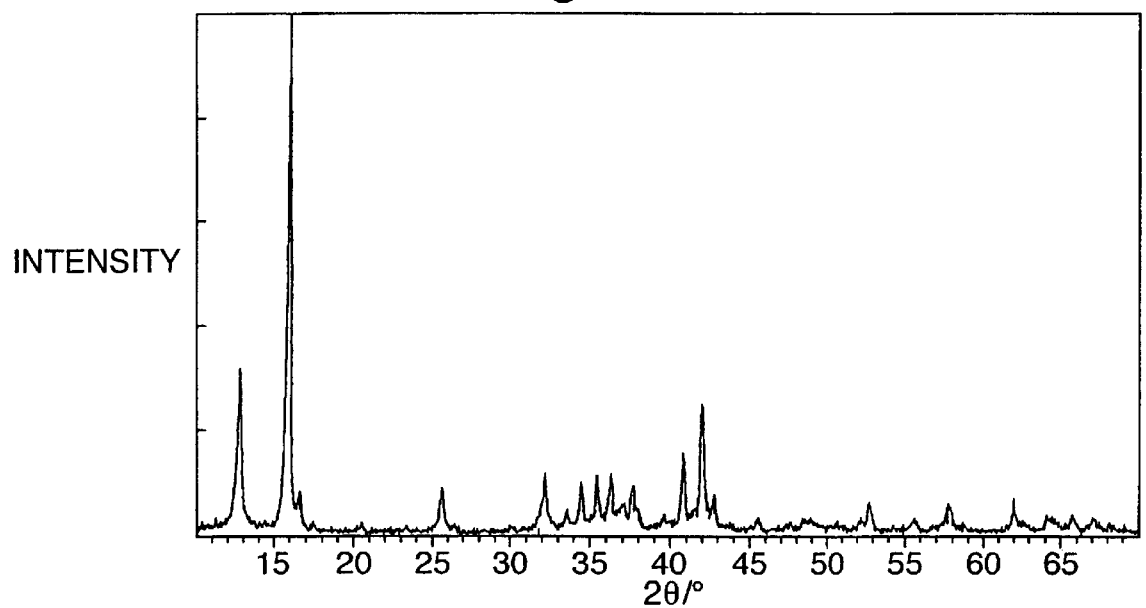
FIG. 1 shows an X-ray diffraction pattern for one type of sodium manganese oxide.
Figure 2:
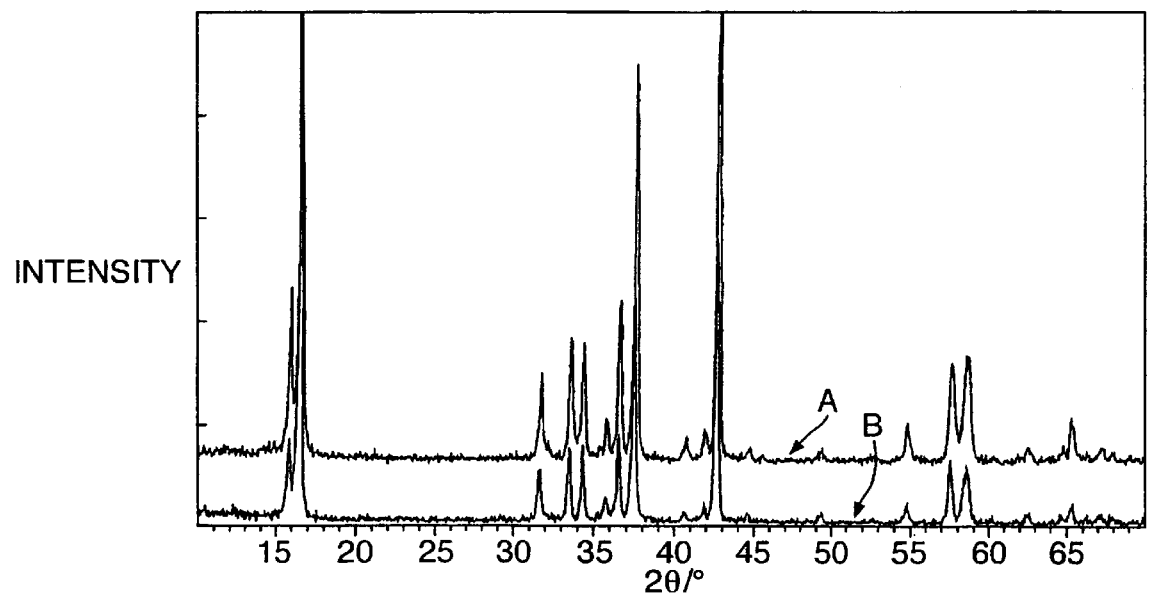
FIG. 2 shows X-ray diffraction patterns for sodium manganese oxide made by two different routes (one being that of the invention)

Referring now to FIGS. 1 and 2, X-ray diffraction patterns were then obtained using a copper K-$\alpha$ X-ray source, to compare sodium manganese oxides made in three different ways: sodium manganese oxide $NaMnO_2$ made by the solid state process described above (see FIG. 2, graph A); sodium manganese oxide $NaMn_2$ made by the solution process described in the preceding paragraph, with rapid cooling after the furnace treatment (see FIG. 2, graph B); and sodium manganese oxide made by the solution process but with gradual cooling after the furnace treatment (see FIG. 1). From a comparison of the two graphs of FIG. 2 it is clear that the oxide made by the solution process is substantially identical to that made by the solid state process. From a comparison of the graphs of FIGS. 1 and 2 it is clear that if the oxide is allowed to cool gradually, it forms a very different crystal structure.

The sodium manganese oxide $NaMnO_2$ (made by the solution process with rapid cooling after the furnace treatment) was then subjected to ion exchange, by refluxing in a solution of lithium bromide in DMA at about 160° C. for 8 hours. A five-fold excess of lithium bromide with respect to sodium manganese oxide was used.

The resulting oxide was then filtered under suction, and washed with ethanol and distilled water. Ethanol was then poured onto the powder and left to stand for more than 90 minutes, before filtering again under suction, to eliminate impurities such as sodium bromide. The oxide powder was then dried under vacuum at 80° C. for 15 hours. The resulting powder was $LiMnO_2$ with a layered monoclinic structure.

Figure 3:
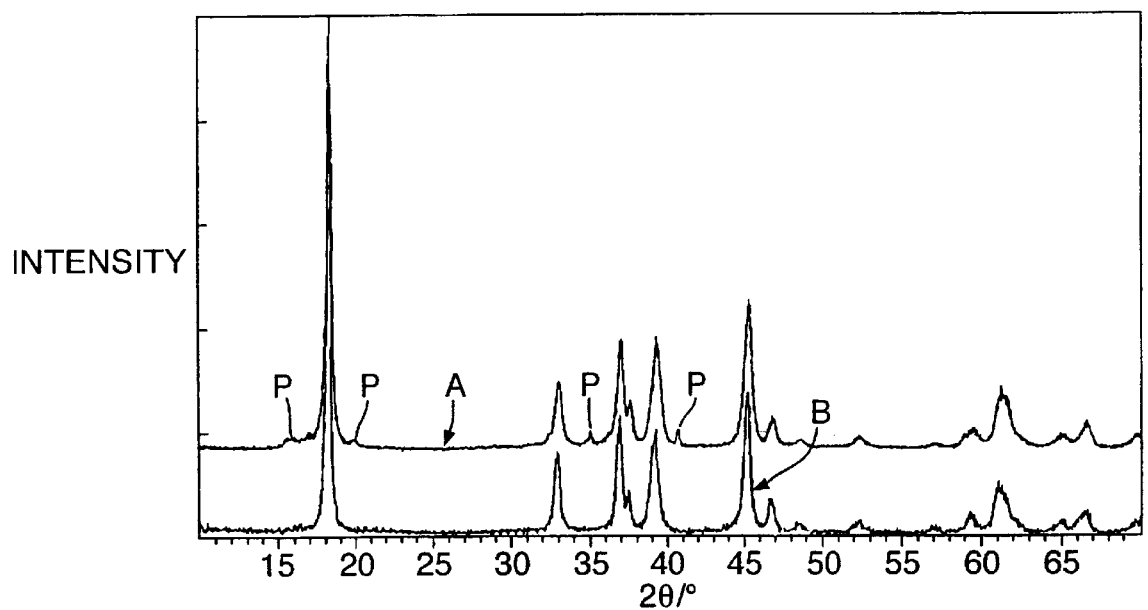
FIG. 3 shows X-ray diffraction patterns for lithium manganese oxide made by two different routes (one being that of the invention)

The crystal structure was confirmed by X-ray diffraction, and by a comparison to the material made using the procedure described by Bruce et al., i.e. making the sodium manganese oxide by solid state reaction, and then subjecting to ion exchange with lithium bromide in solution in n-hexanol. Referring to FIG. 3 graph A shows the diffraction pattern for the oxide made by Bruce et al.'s procedure, and graph B shows the diffraction pattern for the oxide made by the procedure of the present invention. It will be appreciated that the diffraction patterns are substantially identical, but that the phase purity is somewhat better with the procedure of the present invention, as graph A has some small peaks (marked P) indicative of phase impurities, which are not present in graph B.

Both these diffraction patterns A and B resemble those for the lithiated spinel oxide $Li_2Mn_2O_4$, but can be distinguished, particularly by the peaks at large diffraction angles. As described by Bruce et al neutron diffraction may also be used to distinguish between this layered oxide and the spinel oxide; and the electrochemical behaviour of this layered oxide differs significantly from that of the spinel oxide. The diffraction pattern B has been found to fit to that expected from a layered monoclinic structure with the lattice parameters a=5.4312 (82), b=2.8060 (30), c=5.3979 (84) and d=116.08 (9), the numbers in brackets in each case being the uncertainty (one standard deviation) in the last digits.

Figure 4:
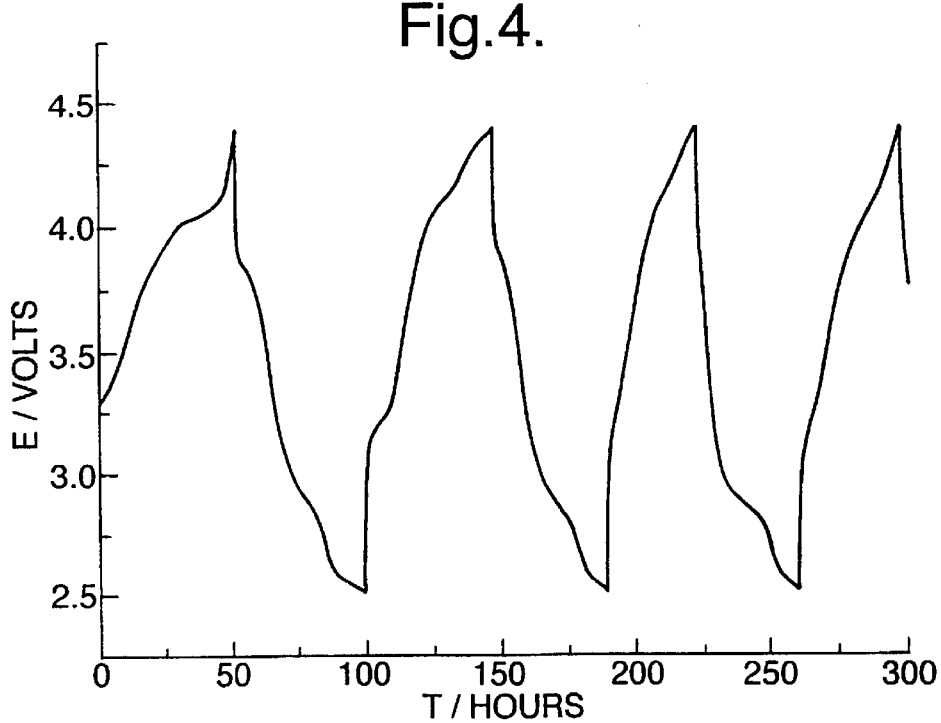
FIG. 4 shows graphically the cycling behavior of an electrochemical cell incorporating lithium manganese oxide of the invention.

Test cells have been made using the lithium manganese oxide made by the procedure of the present invention as the active insertion material (in the cathode), with a lithium metal anode, and an electrolyte solution consisting of 1-molar lithium hexafluoro phosphate in ethylene carbonate/dimethyl carbonate (2:1 by volume). These cells have been cycled at a current density of 16.3 $\mu A/cm^2$ (i.e. a current 0.02 mA over a geometrical area of 1.23 $cm^2$) between voltage limits of 2.5 volts and 4.4 volts. The coulombic efficiency of the first cycle is almost 100 percent. Referring now to FIG. 4, this shows graphically the variation of voltage with time during the first few charge/discharge cycles. It will be observed that there is no pronounced plateau at around 3 volts, as would occur using the tetragonal spinel oxide. Referring now to FIG. 5, this shows graphically the variation in capacity (in mAh per gram of lithium manganese oxide) over the first 16 charge and discharge cycles, at the same current density as mentioned above, the capacity during charge being indicated by the hollow squares, and the capacity during discharge being indicated by the black squares. The average capacity over all these cycles is over 160 mAh/g. It will be observed that the capacity does not significantly decrease during these 16 cycles. In contrast, Bruce et al. found that the capacity of a cell made with their material decreased to less than a third of its initial value over the first 10 cycles.

It will be appreciated that the process for making the layered lithium manganese oxide may differ in certain respects from that described in the example above. For example the solutions used to make the sodium manganese oxide precursor might instead be sodium carbonate dissolved in water, and manganese (II) acetate dissolved in water. This produces a brown precipitate which can be dried and heat treated to produce the sodium manganese oxide. Furthermore the heat treatment might differ from that described above, for example the oxide might be heated to 670° C. for between five and eight hours. Furthermore the ion exchange process might use a different solvent, such as NMP; the process might be performed at a different temperature, such as 200° C.; and might be performed for a different length of time, such as six hours.

I claim:

1. A method of making an oxide $LiQ_xMn_{(1-x)}O_2$, in which Q represents a transition metal and x is less than 0.5, with a layered monoclinic structure, the method comprising:

(a) synthesizing $NaQ_xMn_{(1-x)}O_2$ with a layered structure similar to that of $\alpha$-$NaFeO_2$ by reacting stoichiometric amounts of a sodium salt, a manganese (II) salt, and a salt of the metal Q in solution so as to form a precipitate, drying the precipitate in air, heating the dry precipitate to a temperature of between 650 and 720° C. in air, and then cooling the precipitate to room temperature in air; and (b) subjecting the $NaQ_xMn_{(1-x)}O_2$ to ion exchange with a lithium salt in solution in a non-alcoholic organic solvent at a temperature between about 140 and 210° C.

2. A method as claimed in claim 1 wherein x=0.

3. A method as claimed in claim 1 in which the heating of the dry precipitate is performed with the precipitate in a dish of a good heat conductor, and the dish containing the precipitate is then removed from the furnace and placed in contact with a large metal block at room temperature.

4. A method as claimed in claim 1 in which the ion exchange process is performed under reflux, using a solvent which boils at the temperature at which the ion exchange is performed.

5. A method as claimed in claim 4 in which the solvent is selected from the group consisting of dimethyl acetamide and N-methyl pyrrolidone.

6. A method as claimed in claim 1 in which the ion exchange process of step (b) is performed with a considerable excess of the lithium salt with respect to the $NaQ_xMn_{(1-x)}O_2$.

* * * * *